Sept. 2, 1969 R. C. BYERS 3,464,636
GRINDING AND MIXING APPARATUS AND METHOD
Filed Dec. 14, 1966 3 Sheets-Sheet 1
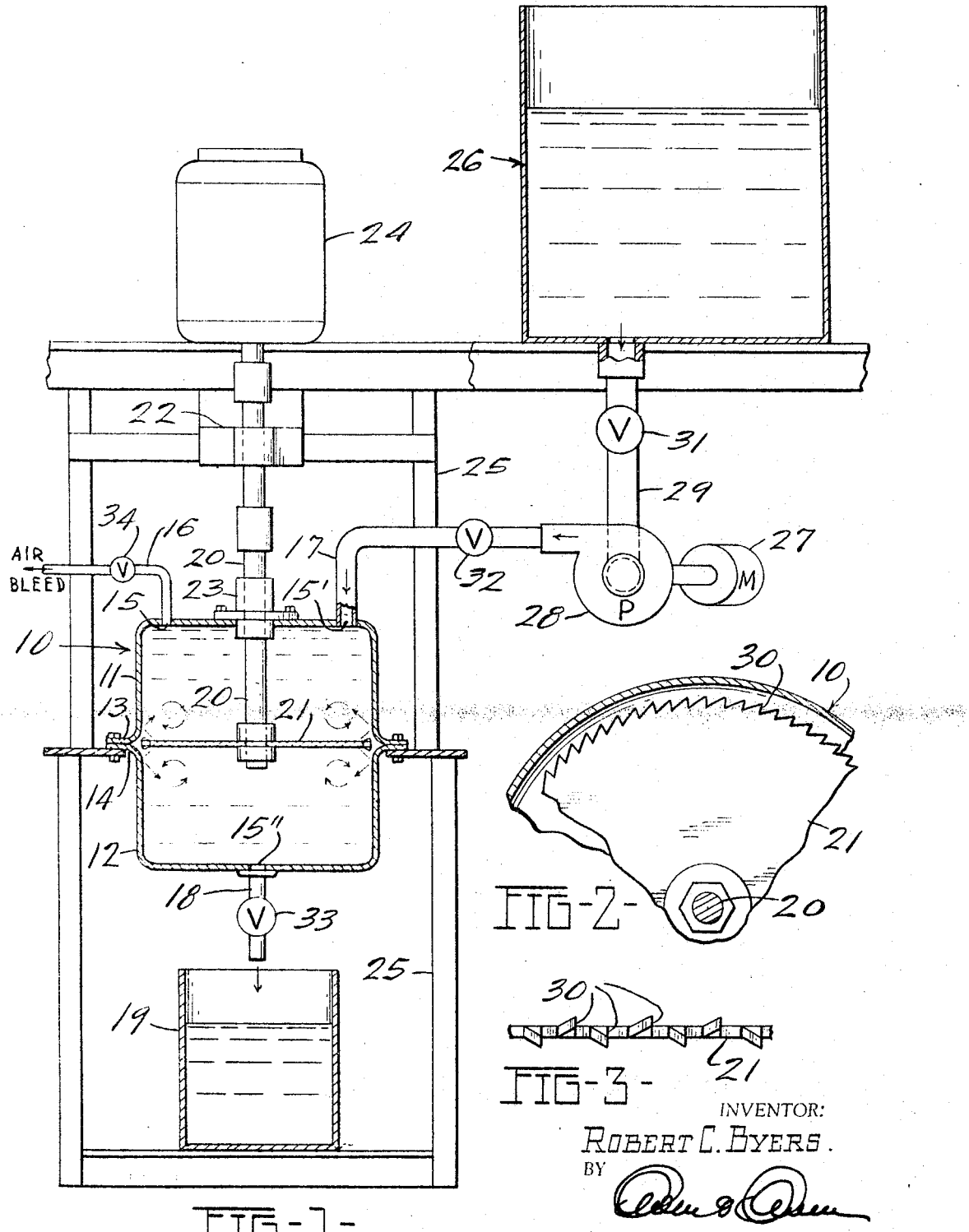
INVENTOR:
ROBERT C. BYERS.
BY
ATT'YS.

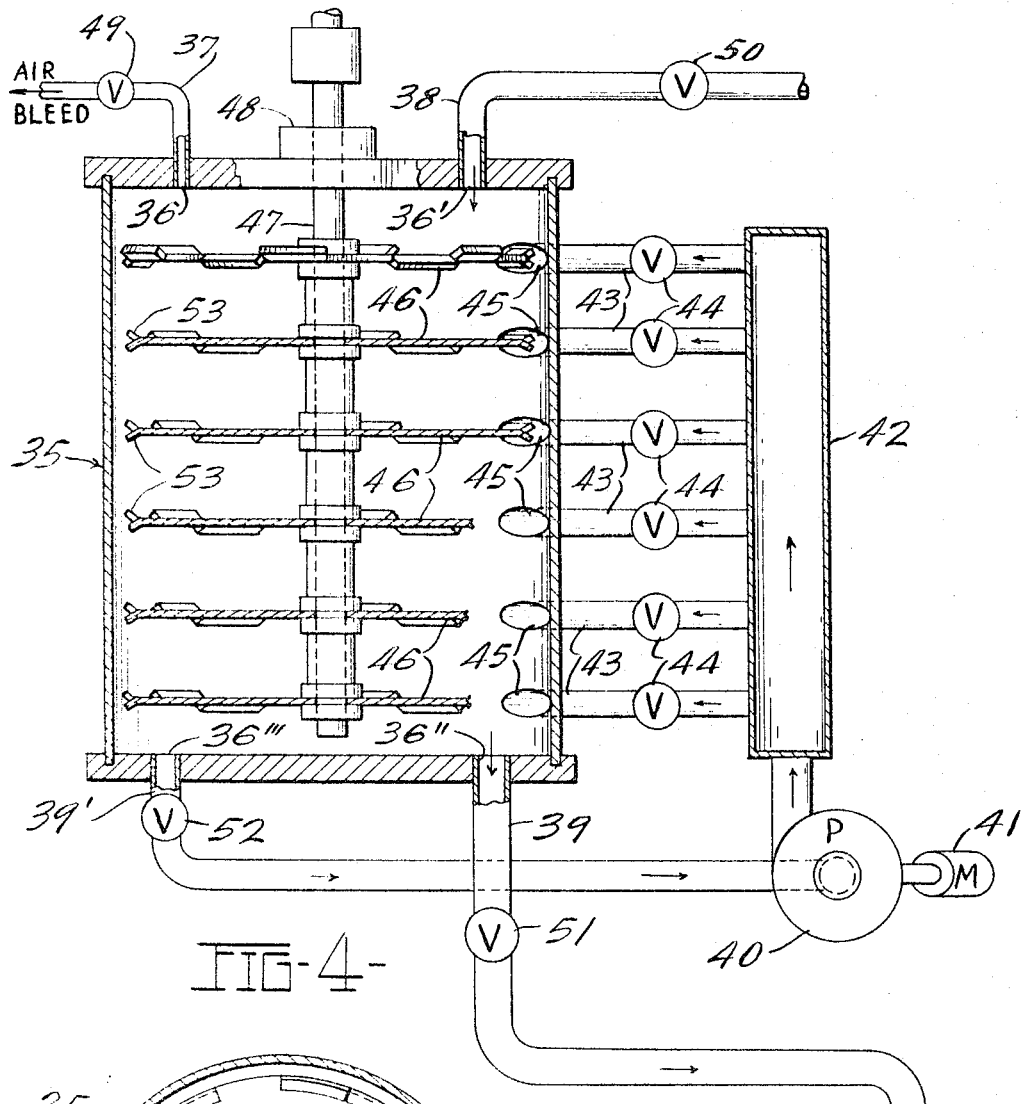
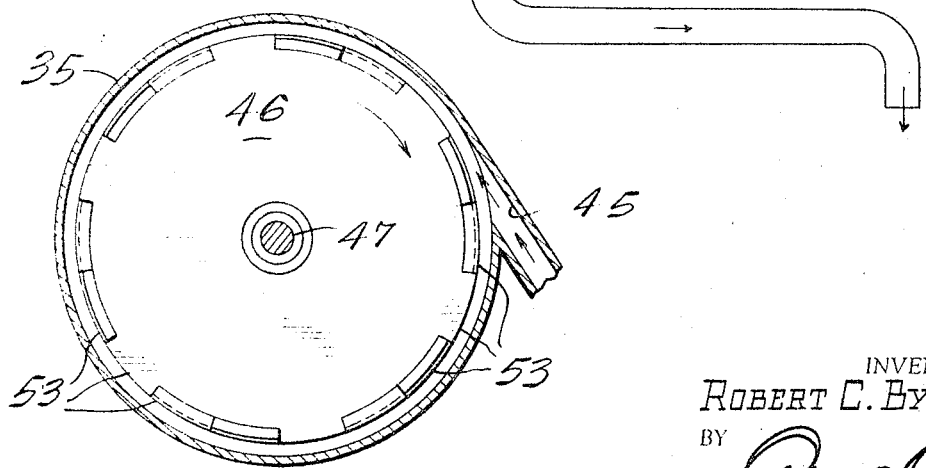

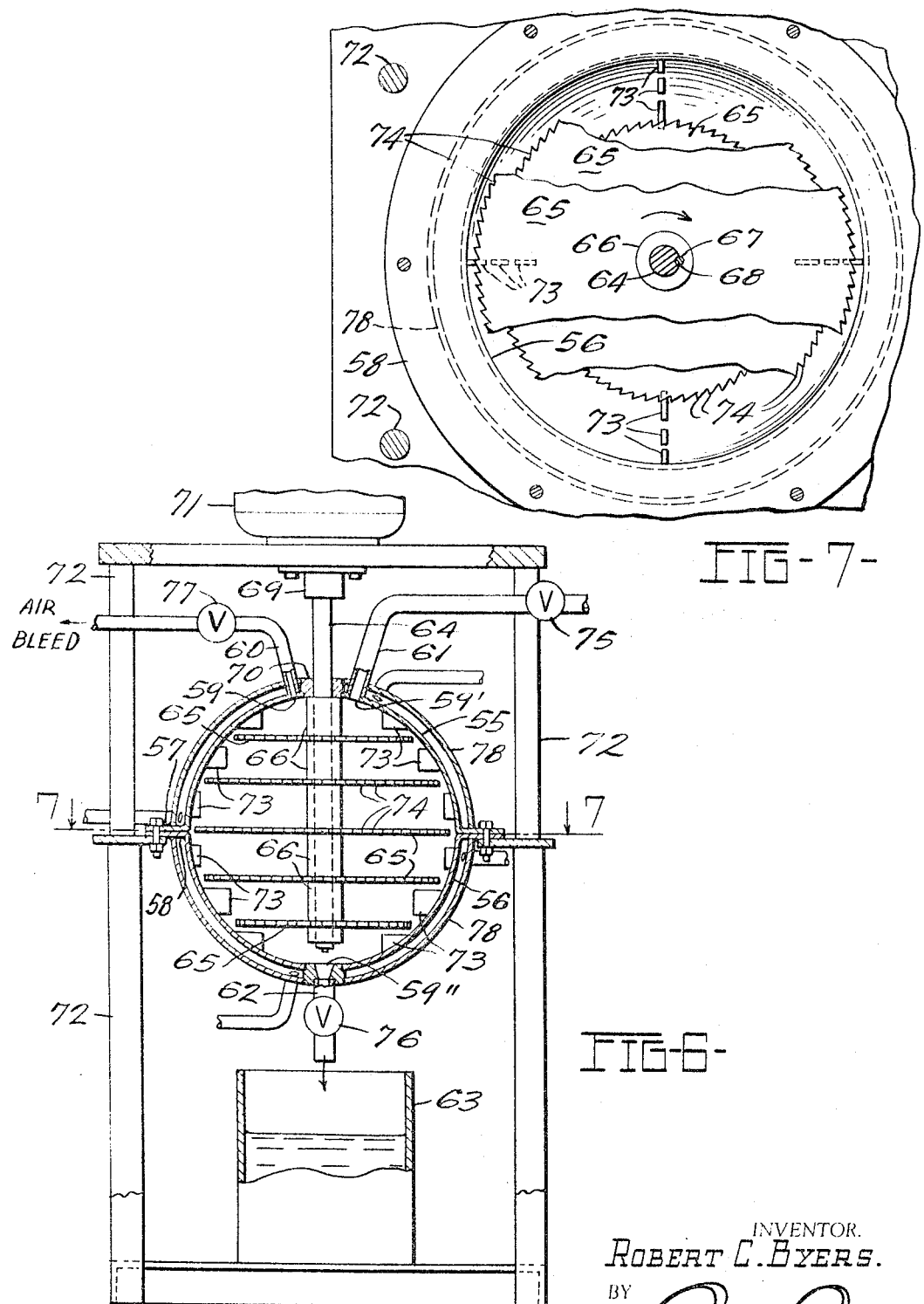

United States Patent Office 3,464,636
Patented Sept. 2, 1969

3,464,636
GRINDING AND MIXING APPARATUS AND METHOD
Robert C. Byers, 4700 S. Otter Creek Road,
La Salle, Mich. 48145
Filed Dec. 14, 1966, Ser. No. 601,793
Int. Cl. B02c *11/08, 7/08, 7/14*
U.S. Cl. 241—21
12 Claims

ABSTRACT OF THE DISCLOSURE

A method of simultaneously grinding and admixing particulate matter in fluid in an air free environment, and apparatus utilized in such method.

The prior art

Most house paints comprise a dispersion of pigment in oil, such as linseed oil, and also contain a number of additives such as resins, solvents, driers, anti-skimming agents and the like which impart various characteristics to the paint. In the manufacture of such paint the pigment is normally admixed with an oil component or vehicle and ground in a pebble or roller mill, and is then usually further admixed with an additional quantity of oil and additives to form the end product. Another method of preparing paint is to simultaneously grind the pigment and admix it with oil in a high speed mixer such as the type disclosed in U.S. Patent 2,424,679. After the initial grinding and admixing step is completed the mass is then "let down" or admixed with an additional quantity of oil and additives to form the end product. The addition of more oil and additives in the above methods is necessary because the grinding apparatus or high speed mixer is more effective with thick pastes, thus in order to obtain maximum grinding effectiveness a paste thicker than the desired end product has to be utilized initially. The mixers of the type disclosed in U.S. Patent 2,424,679 are not very efficient, at least for paint mixing purposes, however, because they are relatively ineffective in grinding the pigment particles to small enough size to form a really fine dispersion. After treatment with this type mixer the paint must ordinarily be strained to remove too large pigment particles. The pigment articles could conceivably be ground to the fine degree required outside the mixer, and then dumped in and admixed with the oil and other ingredients, but it is more economical to simultaneously fine grind and admix the pigment with the oil in the mixer. Thus, even though it is more economical to grind and admix in one operation, the process is relatively inefficient using the high speed grinding and mixing apparatus disclosed in the prior art.

An additional problem encountered when apparatus of the type described in U.S. Patent 2,424,679 is used to prepare paint, particularly latex and acrylic paint, is that air may be drawn into the paint mass during the mixing and grinding operation. As a consequence the latex or acrylic resin and bodying agent foam, resulting in undesirable air entrapment, unless care is exercised so that no deep vortex is formed, which is the main avenue of air contamination in the production of a latex or acrylic product. To eliminate the vortex, the usual procedure, if the blade position is correct, is to slow down the speed of the blade. By slowing down the speed of the blade, this device becomes less efficient.

An improved mixing apparatus and method has now been invented which performs a simultaneous grinding and admixing step more efficiently and economically than the apparatus of the prior art.

Objects

It is therefore an object of this invention to provide an improved and more efficient grinding and mixing apparatus.

It is another object of this invention to provide apparatus for simultaneously grinding and admixing particulate matter in fluid.

It is still another object of this invention to provide a method for simultaneously grinding and admixing particulate matter in fluid, using the apparatus described herein.

It is yet another object of this invention to provide a method for simultaneously grinding and admixing particulate matter in fluid in the absence of air.

A further object is to provide a method for grinding and admixing paint which requires no let down or straining after the grinding operation.

Other objects and advantages of this invention will be apparent from the description which follows, reference being made to the drawings, in which:

FIG. 1 is a partially schematic, partially cross-sectional view of one embodiment of the apparatus of this invention;

FIG. 2 is a plan view of a portion of the mixing blade and outer shell of the mixing tank of the embodiment shown in FIG. 1;

FIG. 3 is a partially cross-sectional view with parts in perspective of a mixing blade used in the apparatus of this invention;

FIG. 4 is a partially cross-sectional, partially schematic view, with parts broken away, of another embodiment of the apparatus of this invention;

FIG. 5 is a horizontal sectional view with parts broken away through the line 5—5 of FIG. 4;

FIG. 6 is a partially schematic, partially cross-sectional view of still another embodiment of the apparatus of this invention; and FIG. 7 is a plan view with parts broken away through the line 7—7 of FIG. 6.

The invention

The invention will be more readily understood by reference to the drawings. Referring to FIG. 1, one embodimen of the apparatus of this invention comprises a completely enclosed cylindrical mixing tank 10 consisting of two half sections 11 and 12, each provided with an outwardly extending flange 13 or 14, respectively at the open end. The half sections 11 and 12 are bolted together at the flanges 13 and 14. The mixing tank 10 is provided with openings 15, 15' and 15" to which are connected, respectively, an air bleed pipe 16 and an inlet pipe 17 on the top of the tank, and an outlet pipe 18 at the bottom thereof leading to receiving tank 19. Extending vertically downwardly into the interior of the mixing tank 10 is a spindle 20 upon which at least one mixing blade 21 is horizontally mounted for rotational movement. The mixing blade 21 is secured at or near the lower end of the spindle 20 in any suitable manner and is preferably spaced midway from the bottom and top of the tank 10 to permit circulation both above and below it. The spindle 20 is held in place by journals 22 and 23 and is driven by a motor 24, mounted above the mixing tank 10 on steel supports 25.

Auxiliary apparatus includes the receiving tank 19, a hold tank 26, and a motor 27 and pump 28, for pumping the material to be treated from the hold tank 26 through a pipe 29 and inlet pipe 17 into the mixing tank 10.

The mixing blade 21 is imperforate and circular with teeth 30 cut into the outer edge which alternately project upwardly and downwardly facing in the direction of rotation. A plan view of the blade is shown in FIG. 2 while a cross-sectional view of the blade is shown in FIG. 3 with the teeth 30 shown in perspective.

Valves 31, 32, 33 and 34 are positioned in pipe 29, inlet pipe 17, outlet pipe 18 and air bleed pipe 16, respectively, to regulate the flow of fluid, and in the case of valve 34, air and/or fluid.

Another embodiment of the apparatus of this invention is shown in FIG. 4. In essence this embodiment comprises a completely enclosed cylindrical tank 35 with openings 36, 36', 36" and 36'" provided therein for attachment of an air bleed pipe 37, input pipe 38, output pipe 39, and recirculation pipe 39', respectively. The output pipe 39 leads to a receiving tank (not shown) and the recirculation pipe 39' leads to a recirculating pump 40 driven by a motor 41 which recirculates admixed fluid and particulate material and pumps it back into the tank 35 by way of a header 42 through horizontal branch pipes 43, the flow therethrough of which is controlled by valves 44, then through inlets 45. Inlets 45 open tangentially to the wall of the tank 35 and to a plurality of mixing blades 46. The several blades 46 are mounted on a single spindle 47 for rotational movement. The spindle 47 is driven by a motor (not shown) mounted above the tank 35, and is journaled at the top of the tank at 48. Valves 49, 50, 51 and 52 are positioned in pipes 37, 38, 39 and 39', respectively, for regulating flow.

The mixing blades 46 have teeth 53 cut into the edge thereof which alternately point upwardly and downwardly as is shown in FIGS. 4 and 5.

Still another embodiment of the apparatus of this invention is shown in FIGS. 6 and 7. In essence this embodiment comprises an enclosed spherical mixing tank 54 consisting of two hemispheres 55 and 56 provided with outwardly extending flanges 57 and 58, respectively, at their mouths. The hemispheres 55 and 56 are bolted together at the flanges 57 and 58. The mixing tank 54 is provided with openings 59, 59' and 59" therein to which are connected, respectively, an air bleed pipe 60 and an inlet pipe 61 on the top of the tank, and an outlet pipe 62 at the bottom thereof leading to a receiving tank 63. Extending vertically downwardly into the interior of the mixing tank 54 is a spindle 64 upon which a plurality of mixing blades 65 are horizontally mounted for rotational movement. The mixing blades 65 are separated from each other and held in place by collars 66 which fit around the spindle 64, and the blades 65 are keyed to each other by a rod 67 extending vertically through a hole 68 (FIG. 7) in each blade. The spindle 64 is journaled at 69 and 70 and is driven by a motor 71 mounted above the mixing tank 54 on steel supports 72.

Mounted on the inside wall of the mixing tank 54 is a plurality of vertically situated baffles 73 which serve to arrest the circumferential flow, during operation, of any liquid or particulate matter present in the tank 54. The baffles 73 can be of any desired number and of almost any shape. Preferably they extend at right angles from the wall of the mixing tank (FIG. 7). The baffles 73 should be mounted in a manner with sufficient clearance for the blades 65 to be attached to the spindle in the desired position.

Auxiliary apparatus includes a hold tank, a motor and a pump (all not shown) for pumping fluid from the hold tank into the mixing tank 54 through inlet pipe 61, and also the receiving tank 63.

The mixing blades 65 are imperforate and circular with teeth 74 cut into the outer edge which face in the direction of rotation. A plan view of the blades 65 is shown in FIG. 7.

Valves 75, 76 and 77 are positioned in inlet pipe 61, outlet pipe 62 and air bleed pipe 60, respectively, to regulate the flow of fluid, and in the case of valve 77, air and/or fluid.

The mixing tank 54 is optionally but preferably surrounded by a water jacket 78 (FIG. 6) which is used to carry off heat generated by the action of the blades 65 against the particulate material being ground or other material being admixed. Such water jackets are well known to those skilled in the art and need not be discussed in greater detail.

Referring to FIGS. 1 and 2, the method of this invention will be described. Because the apparatus of the invention is particularly suitable for grinding and admixing particulate material in fluid, the method of the invention will be described as if paint were being admixed therein. Untreated pigmented paint from the hold tank 26 is pumped through pipes 29 and 17 into the mixing tank 10 and is pumped therein until the fluid fills the enclosure of the tank 10 entirely. It is of utmost importance that the paint completely fill the enclosure and all entrapped air be vented in order to obtain the improved efficiency of the apparatus of this invention. The reason, therefore, is that if air is present in the tank, it becomes drawn into the paint during the mixing operation and thus forms a cushion between the edges of the teeth 30 of the mixing blade 21 and the pigment or fluid particles, thereby preventing direct impingement of the pigment or fluid against the edge of the teeth 30, and thereby reducing the efficiency of the grinding and mixing operation. To be absolutely sure all of the air is out of the tank 10, it is desirable to add the untreated paint until it is forced out through the air bleed pipe 16. After the paint has completely filled the tank 10 and all the air has been expelled, the motor 24 is started and drives the mixing blade 21 by means of the spindle 20.

The apparatus is operated until the desired degree of mixing and/or grinding is achieved. After the desired result is achieved the valve 33 is opened and the treated paint is allowed to flow into the receiving tank 19. The operation can either be a batch or continuous one.

Preferably, the paint is pumped into the mixing tank 10 at a rate slightly faster than it is removed.

The relation of the mixing blade 21 to the wall of the mixing tank 10 is also particularly important. Thus, in order to obtain the maximum grinding effect, the blade must be close enough to the wall that comminutive force is applied to the pigment or particulate material passing between the wall of the tank 10 and the blade 21. It will be appreciated, therefore, that the optimum distance from the edge of the blade 21 to the wall of the mixing tank 10 will vary, depending on the size and thickness of the blade, the speed of rotation, and the viscosity of the material being ground and admixed. It has been found, in grinding and admixing paint with a viscosity of about 80 Krebs units at 78° F., that the dstance between the edge of the blade 21 and the wall should preferably be less than about ½ inch, more preferably less than about ¼ inch, and most preferably less than about ⅛ inch.

Greater distances can be used, however, particularly if a less viscous material is being ground and admixed, and greater rotating speed is used.

It is well known by those skilled in the art that mixing devices of the type described in U.S. Patent 2,424,679 utilize the principle of high velocity discharge to achieve their effect, that is, the greatest disintegrating effect takes place along the surfaces of the material which is moving at high velocity and the surrounding body of relatively slow moving material. By positioning the mixing blade sufficiently close to the wall of the cylinder so that substantially all of the particulate material comes in contact with the teeth of the blade as it passes from top to bottom, the apparatus of the prior art has been improved upon. Even greater efficiency is obtained when the grinding and mixing is carried out in an air free tank.

In another embodiment of this invention shown in FIG. 4, the mixing tank 35 contains mounted therein a plurality of mixing blades 46 on a single spindle 47. The advantage of a plurality of mixing blades is that the pigment and fluid can be subjected to several sequential treatments in passing from the top to the bottom of the tank. By means of the recirculating pump 40 the pigment or other components to be admixed can be finely ground by repeated treatment. It will be noted that the inlets 45 for the recirculated paint are tangential to the wall of the mixing tank 35 and the paint is pumped into these inlets in a direction opposite to the travel of the mixing blades. Thus, a strong impact is obtained between the recirculated paint and the mixing blades 46 at the points of re-entry into the mixing tank 35 which provides greater mixing and grinding efficiency. In order to obtain maximum efficiency it is also necessary, however, that the mixing tank be completely filled with material to be mixed, i.e., the tank must be free of air, and desirably a portion of the material extends into the air vent pipe 37 as shown in FIG. 4.

While in the preferred embodiments of the apparatus of this invention, the blades 21, 46 or 65 are circular and the mixing tank casing is either cylindrical or spherical in shape, they do not necessarily have to be of this shape. That is, for example, the blades 21, 46 or 65 could be of a shape similar to a rotary type lawnmower blade. The blades 21, 46 or 65 must be of such a shape, however, that they impart sufficient force to the particulate matter, or in this particular instance pigment particles so that the particles are comminuted to the desired degree. Although the preferred mixing tank casing is cylindrical or spherical in shape, use could be made of square or rectangular shaped casings. These would not be as efficient, however.

The operation of the apparatus of this invention will be seen from the following example.

Example I

Paint was supplied to an air-tight cylindrical tank such as shown in FIG. 1. The tank had about a 5 to 6 gallon capacity and was slightly over approximately 12 inches in diameter by 12 inches high. Mounted within the container on a spindle driven by a motor was a 12-inch diameter circular steel mixing blade having 36 teeth (3/16 inch deep, V-shape) cut in the edge thereof which were set 1/4 inch, the points being directed toward the direction of rotation. Before the motor was started the paint completely filled the cylindrical container. The motor was then started and the paint was admixed and ground by the action of the teeth of the blade. The shaft and blade were rotated at motor speed (1750 r.p.m.). The flow of paint was directed downwardly from the inlet 15' against the top surface of the blade 21 and after its impact with the teeth and walls it eventually flowed downwardly along the inner wall of the container toward the outlet connection 15'' at the bottom and from there into the collecting tank 19. Thus, the entire body of paint was made to flow in a continuous marginal stream-like formation from the upper or supply stage, through and past the comminutive stage, and downwardly along the inner surface of the container into the lower or outlet stage. The action of the mixer is such that the faces on the teeth of the blade impinge solidly against the body of paint in contact with the teeth and impart concentrated comminutive forces thereagainst.

Example II

A quantity of pigmented house paint was obtained having a "grind" value of less than 4½. The quantity was then split into two equal parts. One part was fed into an open mixer of the type described in U.S. Patent 2,424,679, Cowles. After the paint was so treated, the "grind" was again measured and the paint was found to have a "grind" value ranging from 4½ to 6. The other portion was fed through a mixing apparatus of the type shown in FIG. 1 herein. The paint completely filled the enclosure and all air was excluded. After treatment the "grind" was measured and the paint had a "grind" value of 7. This was achieved at a 50% increased throughput, i.e., using the apparatus of this invention it was possible to achieve a finer grind at a 50% faster rate, than if a Cowles type mixer had been used. Similar results can be obtained using apparatus such as is described herein and shown in FIGS. 4 and 6 of this application.

Using the apparatus and method disclosed herein, it is not necessary to "let down" or add additional oil and additives to paints after the grinding and admixing treatment, i.e. the grinding efficiency of the apparatus is so great that thick pastes do not have to be used and paints having the desired end product viscosity and composition can be utilized initially. Also it is not necessary to strain paints to remove large pigment particles which have been treated in accordance with the method of this invention. In addition, because the treatment is carried out in the absence of air, foaming of paints or other material being treated is prevented.

While the operation of the method apparatus of this invention has been described chiefly in terms of the grinding and mixing of paint, the method and apparatus is also useful to perform other functions such as shearing, mixing, blending, homogenizing, churning and chlorinating. It is particularly useful in mixing cosmetics and can be used in the food industry in the blending, mixing and disintegrating of organic materials, such as the preparation of tomato juice from whole tomatoes, for example. Numerous other uses will be apparent to those skilled in the art. It will be appreciated that minor modifications can be made in the apparatus and method of this invention without departing from the scope and spirit of the appended claims.

What I claim is:

1. Apparatus for grinding and admixing materials in fluids, comprising, an enclosed casing, at least one imperforate blade mounted for rotation in said casing, said enclosed casing being provided with inlet and outlet means and an air vent for bleeding off entrapped air from said enclosed casing when said enclosed casing is completely filled.

2. The apparatus of claim 1 wherein the blade has teeth on the periphery thereof with diverging surfaces.

3. Apparatus for grinding and disseminating materials in fluids, comprising, an enclosed cylindrical casing, an imperforate circular blade mounted for rotation in said casing, said blade having teeth on the periphery thereof with diverging surfaces, the edge of said blade being spaced apart from the wall of said casing by no more than about ½ inch, said enclosed casing being provided with inlet and outlet means and an air vent for bleeding off entrapped air from said enclosed casing when said enclosed casing is completely filled.

4. Apparatus for grinding and disseminating materials in liquids, comprising, an enclosed spherical casing, a plurality of spaced apart imperforate blades mounted for rotation in said casing, said blades having teeth on the peripheries thereof with diverging surfaces, the edge of each blade being spaced apart from the wall of said casing by no more than about ½ inch as measured in the same horizontal plane, said enclosed casing being provided with inlet and outlet means and an air vent for bleeding off entrapped air from said enclosed casing when said enclosed casing is completely filled.

5. Apparatus for grinding and disseminating materials in fluid, comprising, an enclosed cylindrical casing, a plurality of imperforate blades mounted for rotation in said casing, each of said blades having teeth on the periphery thereof with diverging surfaces, each of said blades being spaced apart from the wall of said casing by no more than about ½ inch, said enclosed casing being provided with inlet and outlet means and an air vent for bleeding off entrapped air from said enclosed casing when said enclosed casing is completely filled, said casing provided on the sides thereof with openings through which materials may be introduced, said openings being so constructed the material introduced therethrough impinges against the teeth of said blades in the opposite direction of rotation of the blades, whereby said material substantially loses its centrifugal speed and gradually passes downward to the bottom of the casing.

6. A method for simultaneously grinding and disseminating material in fluid, comprising introducing into apparatus of the class described consisting of a casing and at least one rotatable blade mounted therein a mixture of said material and fluid until said apparatus is completely filled and simultaneously venting air therefrom so that said apparatus when filled with said mixture is devoid of air, and thereafter causing said blade to revolve at a speed sufficient to cause comminuting impingement of said blade upon the particles of said material.

7. The method of claim 6 wherein the treated mixture of material and fluid is withdrawn from said casing at the same rate the untreated mixture is introduced therein.

8. A method for simultaneously grinding and disseminating material in fluid, comprising introducing into apparatus of the class described consisting of a cylindrical casing and a rotatable blade mounted therein a mixture of said material and fluid until said apparatus is completely filled and simultaneously venting air therefrom so that said apparatus when filled with said mixture is devoid of air, and thereafter causing said blade to revolve at a speed sufficient to cause impingement of particles of said material against the wall of said casing with sufficient force to comminute said particles.

9. The method of claim 8 in which the pressure on said mixture of material and fluid inside said casing is maintained at greater than atmospheric pressure.

10. A method of simultaneously grinding and disseminating material in fluid, comprising introducing into apparatus of the class described consisting of a cylindrical casing and a plurality of rotatable blades mounted therein with means for recirculating fluid into said casing, a mixture of said material and fluid until said apparatus is completely filled and simultaneously venting air therefrom so that said apparatus when filled is devoid of air, and thereafter causing said blades to revolve at a speed sufficient to cause comminuting impingement of said blades upon the particles of said material, withdrawing a stream of said mixture, splitting it into two separate streams and reintroducing one of the streams back into said casing through said recirculating means.

11. A method of claim 10 wherein said stream which is reintroduced into the casing is introduced at an angle tangential to the wall of said casing and opposite the direction of the rotation of said blades.

12. A method of claim 10 in which said mixture is subjected to a positive pressure at all times while within said casing.

References Cited

UNITED STATES PATENTS

| | | | |
|---|---|---|---|
| 2,464,588 | 3/1949 | Knudsen et al. | 241—258 X |
| 2,484,509 | 10/1949 | Hopkins | 241—162 X |
| 2,581,414 | 1/1952 | Hochberg | 241—46.17 X |
| 2,855,156 | 10/1958 | Hochberg et al. | 241—46.17 X |
| 3,050,263 | 8/1962 | Barkman et al. | 241—46.17 X |
| 3,135,474 | 6/1964 | Schold | 241—21 |
| 3,298,618 | 1/1967 | Talpey | 241—46.17 |
| 3,337,140 | 8/1967 | Wahl | 241—21 |

FOREIGN PATENTS 1,130,519    2/1957    France.

WILLIAM S. LAWSON, Primary Examiner

U.S. Cl. X.R.

241—27, 46.17, 258; 259—105